US 9,876,708 B2

(12) United States Patent
Pande

(10) Patent No.: US 9,876,708 B2
(45) Date of Patent: *Jan. 23, 2018

(54) NETWORK-ON-CHIP COMPUTING SYSTEMS WITH WIRELESS INTERCONNECTS

(71) Applicant: Washington State University, Pullman, WA (US)

(72) Inventor: Partha Pande, Pullman, WA (US)

(73) Assignee: Washington State University, Pullman, WA (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/726,300

(22) Filed: May 29, 2015

(65) Prior Publication Data

US 2015/0358393 A1 Dec. 10, 2015

Related U.S. Application Data

(60) Provisional application No. 62/010,049, filed on Jun. 10, 2014.

(51) Int. Cl.
G06F 15/16 (2006.01)
H04L 12/733 (2013.01)
H04L 12/721 (2013.01)

(52) U.S. Cl.
CPC .......... H04L 45/122 (2013.01); *H04L 45/124* (2013.01)

(58) Field of Classification Search
USPC ....... 709/201, 224, 214, 244, 249, 251, 252, 709/253
See application file for complete search history.

(56) References Cited

U.S. PATENT DOCUMENTS

| 8,270,316 | B1 | 9/2012 | Chang et al. |
| 2008/0183927 | A1 | 7/2008 | Rofougaran |
| 2009/0196199 | A1 | 8/2009 | Rofougaran et al. |
| 2011/0103799 | A1 | 5/2011 | Shacham et al. |

OTHER PUBLICATIONS

International Search Report and Written Opinion dated Jun. 3, 2014, in International Application No. PCT/US14/016205, 14 pages.
Office Action issued by USPTO in U.S. Appl. No. 14/767,992, dated Jun. 17, 2016, 10 pages.
Notice of Allowance issued by USPTO in U.S. Appl. No. 14/767,992, dated Nov. 16, 2016, 7 pages.
(Continued)

*Primary Examiner* — Lan-Dai T Truong
(74) *Attorney, Agent, or Firm* — Liang IP, PLLC

(57) ABSTRACT

Several embodiments of the present technology are related to network-on-chip based integrated circuits with wireless interconnects. In one embodiment, a computing device includes a plurality of computing cores on a common substrate. The computing cores are organized into a plurality of subnets individually associated with a set of the computing cores, a communications hub associated with the set of the computing cores, and a plurality of conductive or semi-conductive connectors connecting the set of the computing cores into a small world network. The computing device further includes a plurality of wireless transceivers on the substrate, the wireless transceivers being individually associated with one of the communications hubs of a corresponding subnet.

20 Claims, 7 Drawing Sheets

(56) References Cited

OTHER PUBLICATIONS

International Preliminary Report on Patentability dated Jun. 3, 2014, in International Application No. PCT/US14/016205, 11 pages.
B. Razavi, "Design of millimeter-wave CMOS radios: a tutorial", IEEE Trans. Circuits Syst. I, vol. 56, No. 1, Nov. 2009, pp. 4-16.
M. F. Chang et al., "RF Interconnects for Communications On-Chip", Pro-ceedings of International Symposium on Physical Design, Apr. 13-16, 2008, pp. 78-83.
A. Ganguly et al., "Scalable Hybrid Wireless Network-on-Chip Architec-tures for Multi-Core Systems", IEEE Transactions on Computers (TC), vol. 60, issue 10, 2011, pp. 1485-1502.
R. Marculescu et al., "Outstanding Research Problems in NoC Design: System, Microarchitecture, and Circuit Perspectives", IEEE Transaction on Computer-Aided Design of Integrated Circuits and Systems, vol. 28, No. 1, Jan. 2009, pp. 3-21.
U. Y. Ogras and R. Marculescu, "Application-specific network-on-chip architecture customization via long-range link insertion", IEEE/ACM Inter-national Conference on Computer-Aided Design, ICCAD, Nov. 6-10, 2005, pp. 246-253.
U. Y. Ogras and R. Marculescu, "It's a Small World After All: NoC Per-formance Optimization Via Long-Range Link Insertion", IEEE Transactions on Very Large Scale Integration (VLSI) Systems, vol. 14, No. 7, Jul. 2006, pp. 693-706.
A. Kumar et al., "Toward Ideal On-Chip Communication Using Express Virtual Channels," IEEE Micro, vol. 28, Issue 1, Jan.-Feb. 2008, pp. 80-90.
T. Krishna et al., "NoC with Near-Ideal Express Virtual Channels Using Global-Line Communication," Proc. of IEEE Symposium on High Perfor-mance Interconnects, HOTI, Aug. 26-28, 2008, pp. 11-20.
K. Chang et al., "Performance Evaluation and Design Trade-Offs for Wire-less Network-on-Chip Architectures", ACM Journal on Emerging Technol-ogies in Computing Systems (JETC), vol. 8, No. 3, Aug. 2012.
A. Shacham et al., "Photonic Network-on-Chip for Future Genera-tions of Chip Multi-Processors", IEEE Transactions on Computers, vol. 57, No. 9, 2008, pp. 1246-1260.
I. O'Connor et al., "Systematic Simulation-Based Predictive Syn-thesis of Integrated Optical Interconnect," IEEE Transactions on Very Large Scale In-tegration (VLSI) Systems, vol. 15, No. 8, Aug. 2007, pp. 927-940.
D. Vantrease et al., "Corona: System Implications of Emerging Nanopho-tonic Technology," Proc. of IEEE International Sympo-sium on Computer Architecture (ISCA), Jun. 21-25, 2008, pp. 153-164.
M. F. Chang et al., "CMP Network-on-Chip Overlaid With Multi-Band RF-Interconnect," Proc. of IEEE International Symposium on High-Performance Computer Architecture (HPCA), Feb. 16-20, 2008, pp. 191-202.
D. Zhao and Y. Wang, "SD-MAC: Design and Synthesis of a Hardware-Efficient Collision-Free QoS-Aware MAC Protocol for Wireless Network-on-Chip," IEEE Transactions on Computers, vol. 57, No. 9, Sep. 2008, pp. 1230-1245.
Dan Zhao and Ruizhe Wu, "Overlaid Mesh Topology Design and Dead-lock Free Routing in Wireless Network-on-Chip", in Proceed-ings of IEEE/ACM International Symposium on Networks-on-Chip, May 2012, pp. 27-34.
D. Zhao et al., "Design of multi-channel wireless NoC to improve on-chip communication capacity", Proceedings of the fifth ACM/IEEE Internation-al Symposium on Networks-on-Chip 2011, pp. 177-184. Sep. 2008.
J. Lin et al., "Communication Using Antennas Fabricated in Silicon Integrat-ed Circuits," IEEE Journal of Solid-State Circuits, vol. 42, No. 8, Aug. 2007, pp. 1678-1687.
Y. P. Zhang et al., "Propagation Mechanisms of Radio Waves Over Intra-Chip Channels with Integrated Antennas: Frequency-Domain Measure-ments and Time-Domain Analysis", IEEE Transactions on Antennas and Propagation, vol. 55, No. 10, Oct. 2007, pp. 2900-2906.
E. Seok and K. K. O, "Design Rules for Improving Predictability of On-Chip Antenna Characteristics in the Presence of Other Metal Structures", Proceed-ings of IEEE International Interconnect Tech-nology Conference, Jun. 6-8, 2005, pp. 120-122.
J. Branch et al., "Wireless Communication in a Flip-Chip Package using Integrated Antennas on Silicon Substrates," IEEE Electron Device Letters, vol. 26, No. 2, Feb. 2005, pp. 115-117.
J. Mehta, and K. K. O, "Switching Noise of Integrated Circuits (IC's) Picked up by a Planar Dipole Antenna Mounted Near the IC's," IEEE Transactions on Electro-Magnetic Compatibility, vol. 44, No. 5, May 2002, pp. 282-290.
S. B. Lee et al., "A Scalable Micro Wireless Interconnect Structure for CMPs", Proceedings of ACM Annual International Conference on Mobile Compu-ting and Networking (MobiCom), Sep. 2009, pp. 217-228.
D. DiTomaso et al., "iWise: Inter-router wireless Scalable Express Channels for Network-on-Chips (NoCs) Architecture", Proceedings of Annual Sym-posium of High Performance Interconnects (HOTI), 2011, pp. 11-18.
D. J. Watts and S. H. Strogatz, "Collective dynamics of 'small-world' net-works," Nature 393, 1998, pp. 440-442.
C. Teuscher, "Nature-Inspired Interconnects for Self-Assembled Large-Scale Network-on-Chip Designs," Chaos, 17 (2):026106, 2007.
T. Petermann and P. De Los Rios, "Physical realizability of small-world networks," Physical Review E, 73:026114, 2006.
S. Kirkpatrick et al., "Optimization by Simulated Annealing," Science. New Series 220 (45978): 671-680. May 13, 1983.
E. W. Dijkstra, "A note on two problems in connexion with graphs", Numerische Mathematik 1, 1959, pp. 269-271.
T. Jansen, and I. Wegener, "A comparison of simulated annealing with a simple evolutionary algorithm on pseudo-boolean functions of unitation", Theoretical Computer Science, 386, 2007, pp. 73-93.
B. A. Floyd et al., "Intra-Chip Wireless Interconnect for Clock Distribution Implemented With Integrated Antennas, Receivers, and Transmitters", IEEE Journal of Solid-State Circuits, vol. 37, No. 5, May 2002, pp. 543-552.
M. J. Deen and O. Marinov "Effect of forward and reverse substrate biasing on low-frequency noise in silicon PMOSFETs", IEEE Transactions on Elec-tron Devices, 49, 3, 2002, pp. 409-413.
G. Kathiresan and C. Toumazou, "A low voltage bulk driven down-conversion mixer core". In Proceeding of the IEEE Interna-tional Symposium on Circuit and Systems, 2, 1999, pp. 598-601.
X. Yu, et al., "A Wideband Body-Enabled Millimeter-Wave Trans-ceiver for Wireless Network-on-Chip", Proceedings of the 54th IEEE Midwest Sym-posium on Circuits and Systems 2011, pp. 1-4.
J. Draper, et al., "Routing in Bidirectional k-ary n-cube switch the Red Rover Algorithm", In Proceedings of the International confer-ence on Parallel and Distributed Processing Techniques and Appli-cations, 1997,1184-93.
A. Kumar, et al. "Token flow control", Proceedings of the 41st IEEE/ACM International Symposium on Microarchitecture, MICRO-41, 2008, pp. 342-353.
R. Holsmark, et al., "HiRA: A Methodology for Deadlock Free Routing in Hierarchical Networks on Chip", In Proceedings of International Symposi-um on Network-on-Chip, 2009.
P. P. Pande, et al., "Performance Evaluation and Design Trade-offs for Network-on-chip Interconnect Architectures", IEEE Transac-tions on Com-puters, vol. 54, No. 8, Aug. 2005, pp. 1025-1040.
X. Yu et al., "Performance evaluation and receiver front-end design for on-chip millimeter-wave wireless interconnect", in Proc. IEEE IGCC 2010.
S. Deb, et al., "Enhancing Performance of Network-on-Chip Archi-tectures with Millimeter-Wave Wireless Interconnects", Proceed-ings of IEEE Interna-tional Conference on ASAP, 2010, pp. 73-80.
B.G. Lee et al., "Ultrahigh-Bandwidth Silicon Photonic Nanowire Wave-guides for On-Chip Networks," IEEE Photonics Technology Letters, vol. 20, No. 6, Mar. 2008, pp. 398-400.

NETWORK-ON-CHIP COMPUTING SYSTEMS WITH WIRELESS INTERCONNECTS

CROSS-REFERENCE TO RELATED APPLICATION(S)

This application claims priority to U.S. Provisional Application No. 62/010,049, filed on Jun. 10, 2014, the disclosure of which is incorporated herein in its entirety.

BACKGROUND

High complexities and computational data demands have contributed to an increase in parallel computing technology. For example, individual computing systems can include integrated circuits or chips each with multiple built-in computing processors, referred to as "cores." The throughput of such integrated circuits can be substantial to, for example, service multiple concurrent computational requests. Other considerations for such integrated circuits or chips can also include energy consumption, heat dissipation, and/or other parameters.

DETAILED DESCRIPTION

Figure 1:
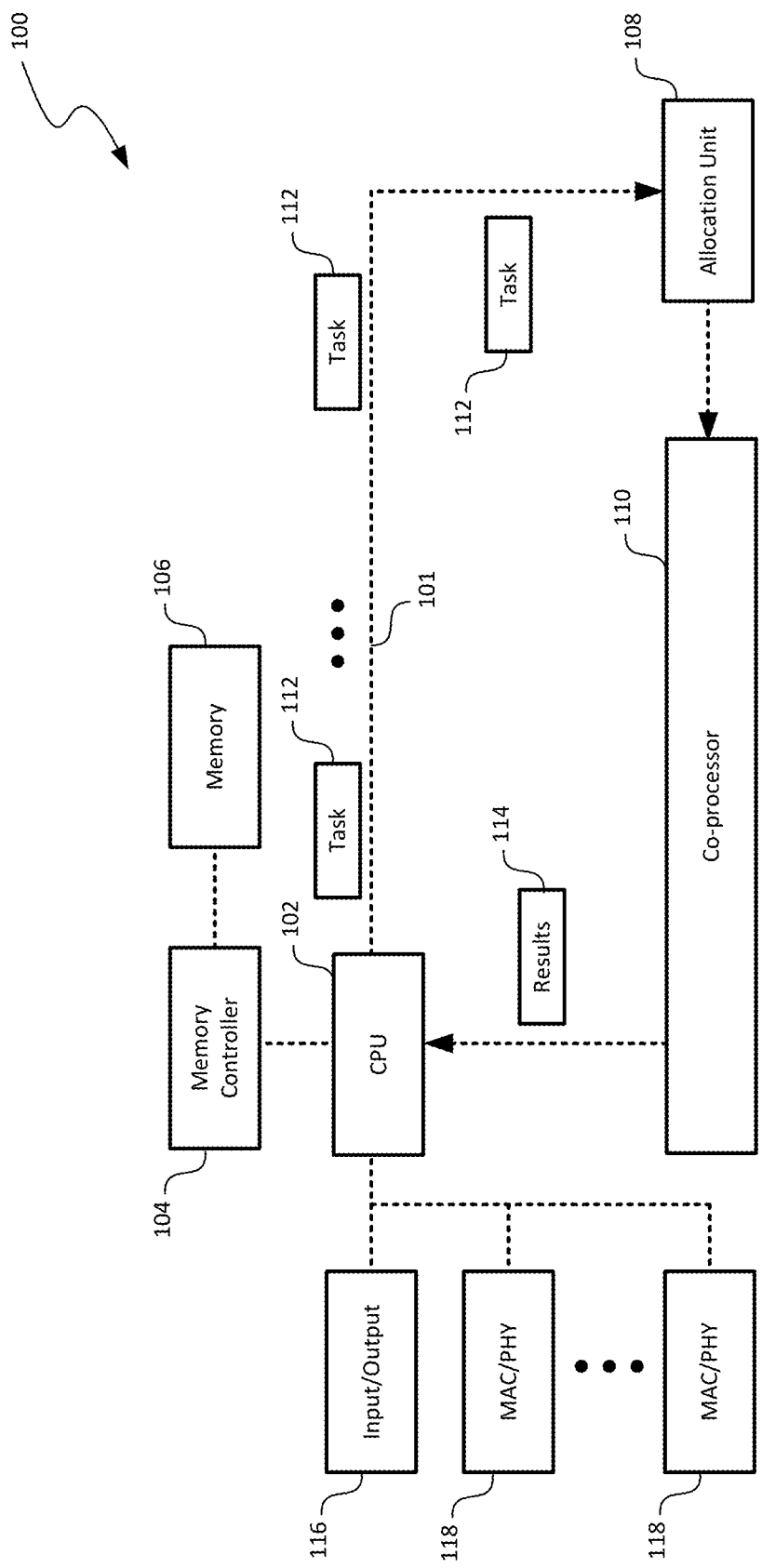
FIG. 1 is a schematic diagram of a computing system in accordance with embodiments of the technology.

This document describes network-on-chip based integrated circuits with wired and wireless interconnects and associated methods of configuration and/or fabrication. This document also described computing devices and/or computing systems incorporating such integrated circuits. Several of the details set forth below are provided to describe certain embodiments of the technology in a manner sufficient to enable a person skilled in the relevant art to practice, make, and use the present technology. Several of the details and advantages described below, however, may not be necessary to practice certain embodiments and methods of the technology. A person skilled in the relevant art will also understand that the technology may have additional embodiments, and that the technology may be practiced without several of the details of the embodiments described below with reference to FIGS. 1-10.

As used herein, the term "computing core" or "core" generally refers to an independent computing processor configured to perform one or more general or customized operations. For example, a core can be configured to perform logical, logarithmic, exponential, multiplication, comparison, trigonometric, and/or other suitable general operations. In other examples, a core may be specifically configured to perform phylogenetic inferences, genome sequencing, climate modeling, weather prediction, video/sound processing, and/or other suitable customized operations.

A core may take many suitable forms. For example, a core can include a reduced instruction set computing ("RISC") processor. In other examples, a core can include a complex instruction set computing ("CISC"), a zero instruction set computer ("ZISC"), a very long instruction word ("VLIW"), and/or other suitable types of computing processor. In further embodiments, a core may include multiple and/or a combination of the foregoing types of processors.

In certain embodiments, a computing device can include multiple cores interconnected as nodes in a small world network. As used herein, the term "small world network" generally refers to a network of interconnected nodes in which a distance L (as measured by a number of "hops") between two randomly chosen nodes grows proportionally to a logarithm of a number of nodes in the network N as follows:

$$L \propto \text{Log } N.$$

One property of the small world network is an average path length, which is defined as an average number of "hops" or steps along the shortest paths for all possible pairs of the nodes in the network. For example, one hop can be from one node to an adjacent node in the network along a connection (e.g., a conductive trace) between the nodes. An average path length can thus be derived by (1) determining the shortest paths (e.g., in hops) for all possible pairs of the nodes in the network; and (2) calculating an average value of the determined shortest paths. In other embodiments, the computing device can include nodes arranged in other suitable types of networks.

Figures 3A, 3B:
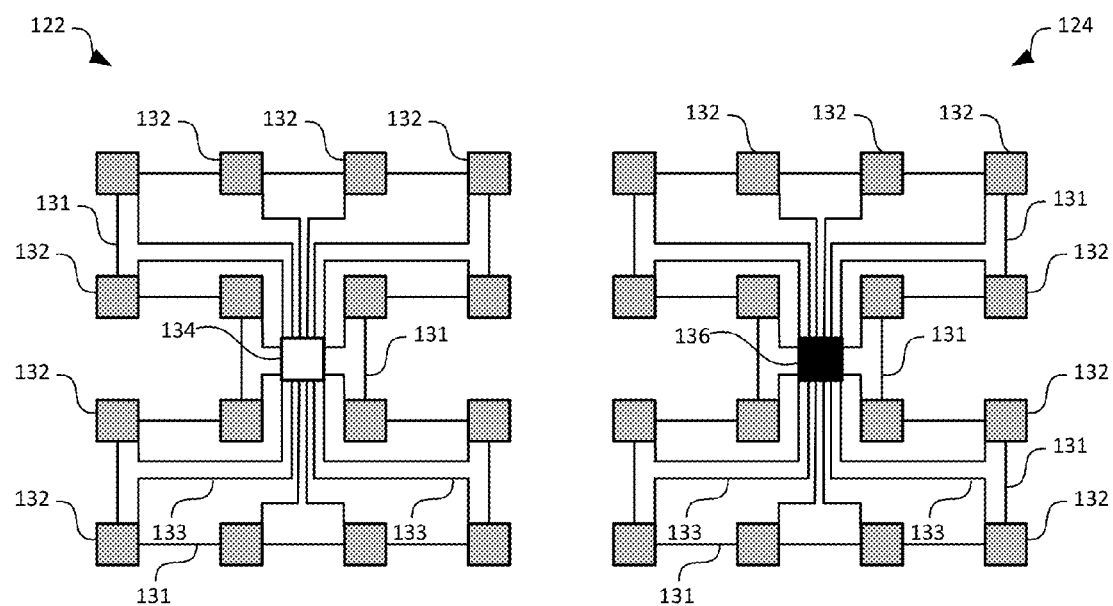
FIG. 3A is a schematic diagram of a wired subnet suitable for the computing device in FIG. 2 in accordance with embodiments of the technology.
FIG. 3B is a schematic diagram of a wireless subnet suitable for the computing device in FIG. 2 in accordance with embodiments of the technology.

The multiple cores can be hierarchically organized into multiple subnets at one, two, or more levels. Also used herein, the term "computing subnet" or "subnet" generally refers to a discrete computing node of a computing device that includes one or more interconnected cores. A subnet has an average path length not larger than that of an upper-level subnet or the entire computing device. The cores in a subnet can also have many suitable arrangements. For example, the cores can be organized in a star-ring arrangement as shown in FIGS. 3A and 3B. In other examples, the cores can be organized in a mesh, a ring, a tree, and/or other suitable arrangements. Cores in a subnet may be in efficient communications with cores in neighboring and/or distant subnets via wired and/or wireless interconnects, as discussed in more detail later.

Figure 2:
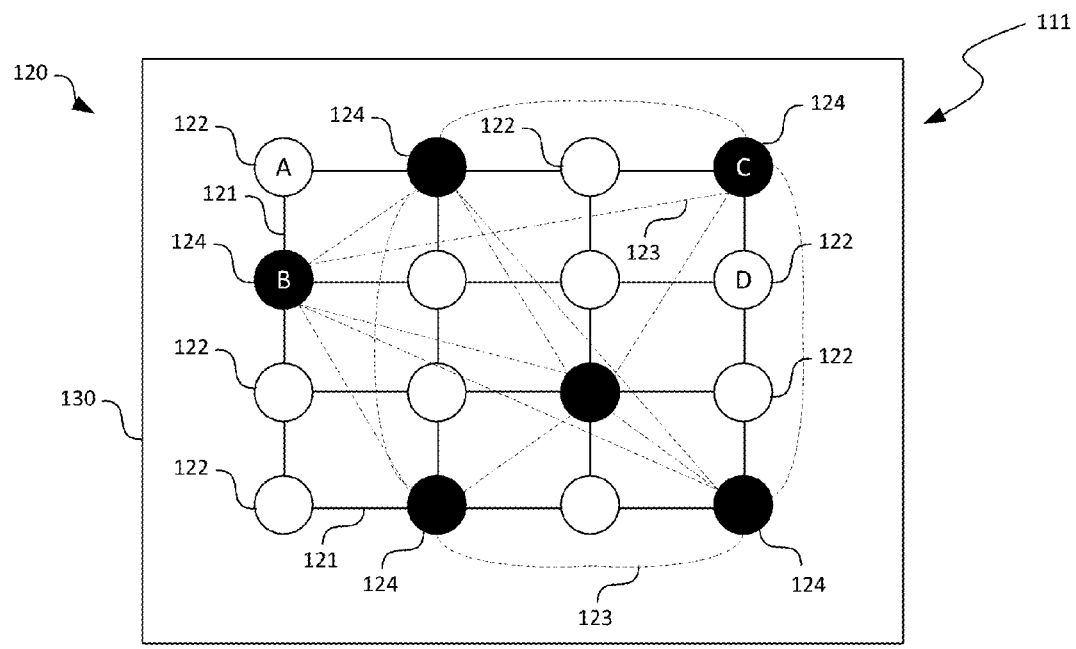
FIG. 2 is a schematic diagram of a computing device with both wired and wireless interconnects in accordance with embodiments of the technology.

Further, the term "mesh" or "mesh structure" generally refers to a network topology for organizing nodes in a computing network. An example mesh network can include multiple nodes arranged in a rectilinear array of a 2, 3, or other suitable number of dimensions. In the rectilinear array, each node is electrically connected to the nearest neighboring nodes. Corresponding pairs of nodes on opposite edges are also connected to one another. An example of a two-dimensional mesh structure is illustrated in FIG. 2, as discussed in more detail below.

Network-on-chip ("NoC") is an integrated circuit architecture according to which an on-chip communications network interconnects multiple computing cores on a common substrate. The NoC architecture can notably improve performance over conventional architectures. However, network traffic congestion can become a bottleneck that impedes further performance improvements. Several embodiments of the present technology implement a hybrid NoC architecture with both wired and wireless interconnects to facilitate efficient on-chip communications amongst the computing cores, as described in more detail below.

FIG. 1 is a schematic diagram of a computing system 100 in accordance with embodiments of the present technology. As shown in FIG. 1, the computing system 100 can include a central processing unit ("CPU") 102, a memory controller 104, a memory 106, an input/output module 116, an allocation unit 108, a co-processor 110, and one or more media access control ("MAC")/physical layer ("PHY") components 118 interconnected by a communication link 101 (e.g., a PCI bus or other suitable communication channels). In certain embodiments, at least some of the foregoing components, for example, the CPU 102, the memory controller 104, the memory 106, the input/output module 116, and the one or more MAC/PHY components 118, may be fabricated on a common substrate (not shown). In other embodiments, the foregoing and/or other components of the computing system 100 may be independent from one another.

The CPU 102 can include a general purpose computing processor. For example, the CPU 102 can include an arithmetic logic unit (not shown) configured to perform arithmetic and/or logic operations and a control unit (not shown) configured to retrieve instructions from the memory 106 via the memory controller 104. In one embodiment, the memory controller 104 and the memory 106 include a dynamic random access memory ("DRAM") controller and DRAM, respectively. In other embodiments, the memory controller 104 and the memory 106 can include flash memory and/or other suitable types of computer readable storage media.

The input/output module 116 can be configured to facilitate communications of the CPU 102 with other components of the computing system 100 and/or external devices (not shown). For example, the input/output module 116 can include hardware/software components that interface with the communication link 101, a keyboard, a mouse, a computer display, a printer, a hard disk drive, an optical disk drive, and/or other suitable peripherals. Examples components for the input/output module 116 can include bridges, bus interfaces, and/or other suitable components.

The MAC/PHY components 118 can be individually configured to connect a link layer device (e.g., a media access control layer) to a physical medium (e.g., an optical fiber, a copper wire, etc.). The MAC/PHY components 118 can include a physical coding sub-layer (not shown) configured to encode and/or decode data transmitted/received via a physical medium dependent layer (not shown). Example MAC/PHY components 118 can include interfaces for WiFi, RS232, Ethernet, universal serial bus, firewire, and/or other suitable communications media.

The allocation unit 108 can be configured to assign one or more tasks 112 from the CPU 102 to the co-processor 110. The allocation unit 108 can assign the tasks 112 in a first-in-first-out manner or other suitable manners based on at least one of a priority, a computation resource requirement, a computation intensity, and/or other suitable characteristics of the tasks 112. In the illustrated embodiment, the allocation unit 108 is shown as an independent component from the co-processor 110 and the CPU 102. In other embodiments, the allocation unit 108 may be integral to the co-processor 110 and/or the CPU 102.

The co-processor 110 can be configured to perform general and/or customized operations in cooperation with the CPU 102. As discussed in more detail below with reference to FIG. 2, the co-processor 110 can include a plurality of cores 132 (shown in FIGS. 3A and 3B) of a small world network hierarchically organized into subnets 120 (shown in FIG. 2) with wired or wireless interconnects between pairs of the subnets 120. By selectively routing messages via the wired and wireless interconnects, the co-processor 110 can achieve efficient communications among the cores and/or subnets. Even though the co-processor 110 is shown as independent from the CPU 102 in FIG. 1, in other embodiments, the co-processor 110 may be incorporated into or embedded in the CPU 102.

In operation, the CPU 102 can execute a computing process assisted by other components of the computing system 100. During execution of the computing process, the CPU 102 can generate one or more tasks 112 for the co-processor 110. The generated tasks 112 are then communicated to the allocation unit 108 via the communication link 101. The allocation unit 108 then assigns the individual tasks 112 to one or more cores 132 of the co-processor 110. The one or more cores 120 can communication with one another via the wired and/or wireless interconnects and execute the assigned tasks 112. Subsequently, the co-processor 100 can return results 114 of executing the assigned task 112 to the CPU 102 via the communication link 101.

FIG. 2 is a schematic diagram of a computing device 111 with both wired and wireless interconnects in accordance with embodiments of the technology. In one embodiment, the computing device 111 may be suitable as the co-processor 110 of the computing system 100 in FIG. 1. In other embodiments, the computing device 111 may be suitable as the CPU 102, the memory controller 104, and/or other suitable components of the computing system 100 in FIG. 1.

As shown in FIG. 2, the computing device 111 can include multiple subnets 120 (as represented by circles) on a common substrate 130. In FIG. 2, sixteen (16) subnets 120 are shown as a mesh for illustration purposes only. In other embodiments, the computing device 111 can include any suitable number of subnets 120 organized in other suitable structures.

The common substrate 130 can include a silicon substrate, a ceramic substrate, or other suitable types of substrate. Each subnet 120 can include multiple cores (not shown) configured generally similarly or differently as cores in other subnets 120. In one embodiment, all of the subnets 120 can include the same number of cores interconnected in the same fashion. In other embodiments, at least one of the subnets 120 can include a different number of cores and/or configured in a different manner as other subnets 120. In certain embodiments, the multiple cores can be interconnected with one another in a star ring structure, as discussed in more detail below with reference to FIGS. 3A and 3B. In other embodiments, the multiple cores can be interconnected in other suitable small world networks.

In the illustrated embodiment, the subnets 120 are organized in a mesh. Pairs of neighboring subnets 120 are interconnected with one another via a wired interconnect 121. The wired interconnect 121 can include a trace, a via, and/or other suitable structures constructed with copper, silver, or other suitable conductive materials. One or more of the subnets 120 can also include a wireless interface that facilitates establishment of wireless interconnects 123 between pairs of subnets 120. For ease of description, subnets 120 with a wireless interface are shown in FIG. 2 as filled-in circles and designated as wireless subnets 124. Subnets 120 without a wireless interface are shown as unfilled circles and designated as wired subnets 122.

The wired subnets 122 and the wireless subnets 124 can communicate with one another via the wireless interconnects 123 and/or the wired interconnects 121. For example, in one embodiment, a wireless subnet 124 can communicate with a neighboring wired subnet 122 via a wired interconnect 121. In another embodiment, a wireless subnet 124 can communicate with any one of the other subnets 124 in a point-to-point fashion via the wireless interconnect 123, as shown in FIG. 2. In other embodiments, at least two of the wireless subnets 124 can be paired to communicate only with each other. Example communications schemes for the wired subnets 122 and the wireless subnets 124 are discussed in more detail below with reference to FIG. 7.

Even though FIG. 2 shows five (5) wireless subnets 124 for illustration purposes, in other embodiments, the computing device 111 can include one, two, three, four, six, or any other suitable number of wireless subnets 124. Also, the number of the wireless subnets 124 as well of the placement thereof may be determined to achieve efficient communications of the subnets 120, as discussed in more detail below with reference to FIG. 6.

FIGS. 3A and 3B are schematic diagrams of a wired subnet 122 and a wireless subnet 124, respectively, suitable for the computing device 111 in FIG. 2 in accordance with embodiments of the technology. As shown in FIGS. 3A and 3B, the wired subnet 122 and the wireless subnet 124 can each include multiple cores 132 interconnected in a star ring configuration. In FIGS. 3A and 3B, sixteen (16) cores 132 are shown for illustration purposes only. In other embodiments, the wired subnet 122 or the wireless subnet 124 can include any suitable number of cores 132 and/or other suitable electrical/mechanical components.

As shown in FIGS. 3A and 3B, the multiple cores 132 are interconnected with one another by multiple connectors 131. In one embodiment, each connector 131 can include a copper, silver, or other suitable types of conductive trace. In other embodiments, the connector 131 can include a wire, a conductive via, and/or other suitable conductive structures.

The connectors 131 also connect all of the multiple cores 132 to a wired hub 134 in FIG. 3A or to a wireless hub 136 in FIG. 3B (collectively referred to as "communications hubs"). Neighboring wired hubs 134 and the wireless hubs 136 are electrically connected by the wired interconnects 121 in FIG. 2. The wired hub 134 can include a network switch (not shown) configured to route communications in the wired subnet 122 and/or from the wired subnet 122 to other wired subnets 122 or wireless subnets 124. For example, in one embodiment, the network switch can route communications among the multiple cores 132 in the wired subnet 122. In another embodiment, the network switch can route communications from one or more of the cores 132 in the wired subnet 122 to another core 132 in another wired subnet 122 or wireless subnet 124.

Figure 4:
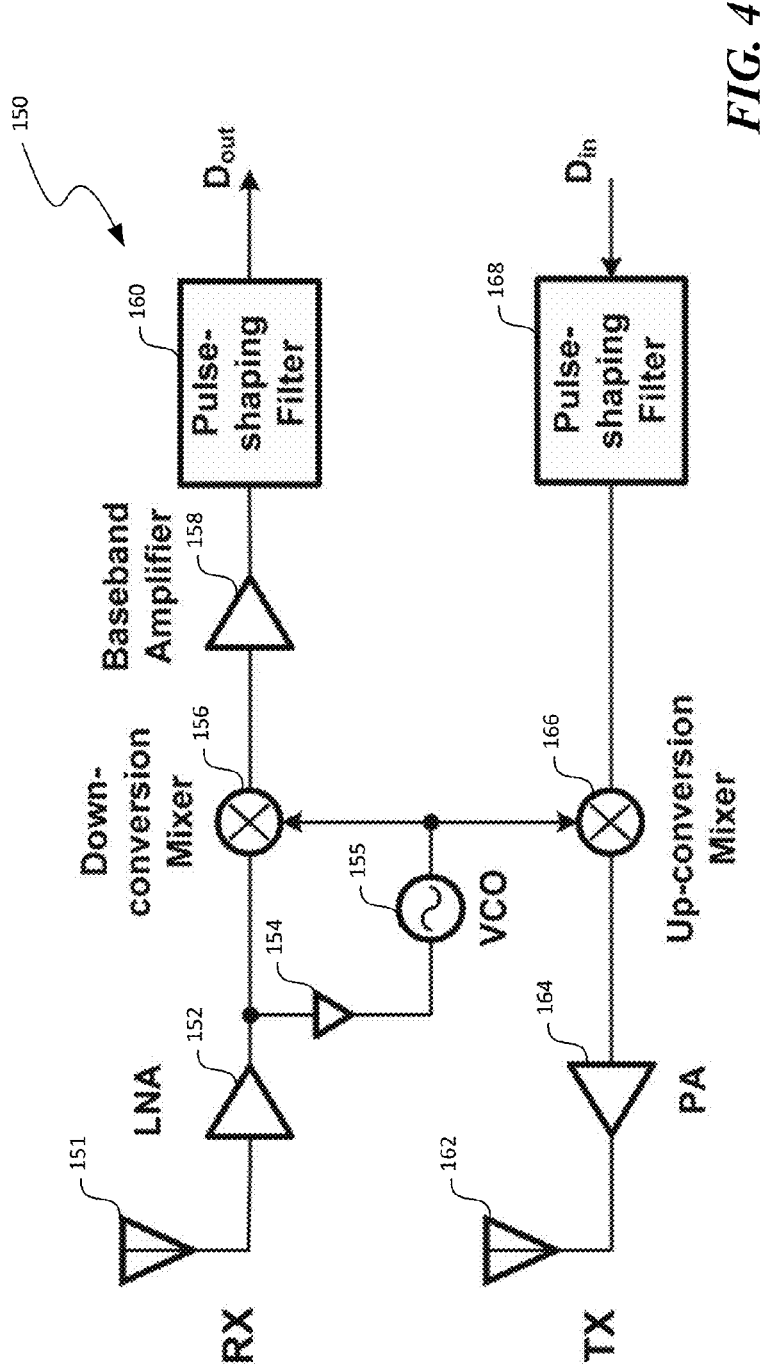
FIG. 4 is a schematic diagram of a wireless transceiver suitable for implementing the wireless interconnect of FIG. 3B in accordance with embodiments of the technology.
Figure 5:
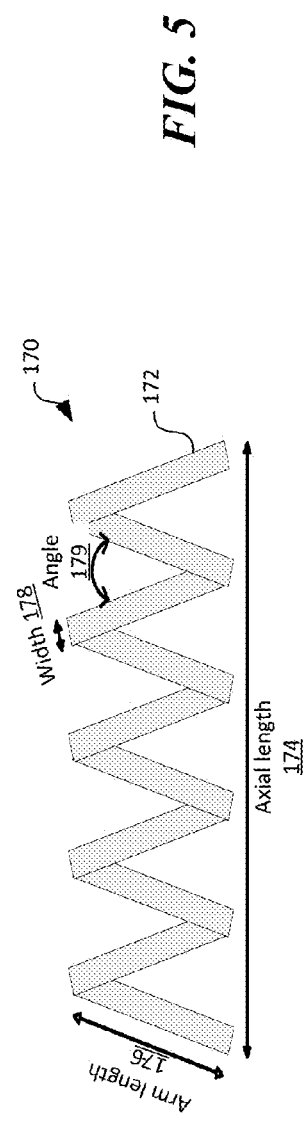
FIG. 5 is a schematic diagram of a wireless antenna suitable for the wireless transceiver of FIG. 4 in accordance with embodiments of the technology.

The wireless hub 136 can include a network switch as described above and a wireless interface configured to facilitate establishment of a wireless interconnect 123 (FIG. 2). In certain embodiments, the wireless interface can include a wireless transceiver as shown in FIG. 4 with a wireless antenna as shown in FIG. 5. In other embodiments, the wireless interface can also include one or more encoders, decoders, filters, modulators, and/or other suitable components.

Referring to FIGS. 2, 3A, and 3B, the cores 132 of a subnets 120 can efficiently communicate with another core 132 in another subnet 120 via the wired interconnects 121 and/or the wireless interconnects 123. Various communications protocols may be implemented. Examples include a packet switched, flit-based wormhole routing, or other suitable types of protocol. As used herein, a "flit" generally refers to a portion of a packet. Example flits may include 8, 16, or other numbers of bits.

In operation, a message (e.g., a packet or flit) from a source core 132 of a wired or wireless subnet 122, 124 is first routed to a respective wired or wireless hub 134, 136 via the connectors 131. The message is then routed to another wired or wireless hub 134, 136 associated with a destination core 132 via the wired or wireless interconnects 121, 123. The message is then routed to the destination core 132 from the wired or wireless hub 134, 136 via the connectors 131.

During routing to the wired or wireless hub 134, 136 associated with the destination core 132, communications with propagation lengths less than a threshold may be routed via the wired interconnects 121 while communications with propagation lengths longer than or equal to the threshold may be routed via the wireless interconnects 123. As used herein, the term "propagation length" generally refers to a number of hops between a source node and a destination node. For example, communications between a core 132 in the wired subnet A 122 to another core 132 in the wireless subnet B 124 can be routed via the wired interconnect 121 because the propagation length (i.e., 1 hop) is below a threshold (e.g., 2 hops). On the other hand, communications between a core 132 in the wireless subnet B 124 to another core 132 in the wireless subnet C 124 may be routed via the wireless interconnect 123 because the propagation length (i.e., 4 hops) is greater than the threshold of 2 hops. In another example, communications between a core 132 in the wireless subnet B 124 to another core 132 in the wired subnet D 122 can be routed via (1) the wireless interconnect 123 to the wireless subnet C 124 and via (2) the wired interconnect 121 to the wired subnet D 122 because the propagation length via the wireless interconnect 123 (i.e., 1 hop) is lower than that via the wired interconnect 121 (i.e., 3 hops) and/or lower than the threshold. One example routing method for determining the threshold and/or routing is discussed in more detail below with reference to FIG. 7.

The foregoing communications scheme can be more efficient in routing communications than conventional techniques. Conventional NoC computing devices can use multi-hop packet switched communications. At each hop, a data packet goes through a complex router/switch, which contributes considerable power, throughput and latency overhead. Without being bound by theory, it is believed that beyond a certain communications length, wireless links are more energy efficient than that via conventional metal wires.

As a result, by routing certain "long range" communications via the wireless interconnects 123, efficient communications among the cores 132 and/or subnets 120 may be achieved.

Even though FIGS. 2, 3A, and 3B show 256 cores 132 organized into one hierarchy level having 16 subnets 120, in other embodiments, the 256 cores 132 may be organized into 4, 8, or other suitable numbers of subnets 120. In further embodiments, the cores 132 may be organized into two, three, or any suitable number of hierarchy levels each having a wired or wireless hub 134, 136. As a result, the computing device 111 may be readily scalable to suit any particular applications.

FIG. 4 is a schematic diagram illustrating an example wireless transceiver 150 suitable for the wireless interfaces in FIG. 3B in accordance with embodiments of the technology. As shown in FIG. 4, the wireless transceiver 150 can include a receiver antenna (RX) 151, a low-noise amplifier (LNA) 152, an amplifier 154, a voltage-controlled oscillator (VCO) 155, a down-conversion mixer 156, a baseband amplifier 158, and a first pulse-shaping filter 160 operatively coupled to one another. The wireless transceiver 150 can also include a transmitting antenna (TX) 162, a power amplifier (PA) 164, an up-conversion mixer 166, and a second pulse shaping filter 168 operatively coupled to one another. The down-conversion mixer 156 and the up-conversion mixer 166 are electrically coupled to one another.

Various types of antenna may be used for the receiver antenna 151 and/or the transmitting antenna 162 (collectively referred to as "antenna"). For example, the antenna can include a zigzag antenna. In another example, the antenna can include a carbon nanotube antenna. In further examples, the antenna can include other suitable components and/or configurations. Though particular embodiments of the wireless transceiver 150 are described above with reference to FIG. 4, in other embodiments, the wireless transceiver 150 can include additional and/or different components and/or configurations.

FIG. 5 is a schematic diagram of a wireless antenna 170 suitable for the wireless transceiver of FIG. 4 in accordance with embodiments of the technology. As shown in FIG. 5, the wireless antenna 170 includes a conductive material 172 (e.g., copper) arranged in a zigzag pattern. The wireless antenna 170 has an axial length 174, an arm length 176, an arm width 178, and an arm angle 179. Values for the foregoing parameters of the wireless antenna 170 may be selected based on at least one of a frequency, an available surface area, and/or other suitable parameters.

Figure 6:
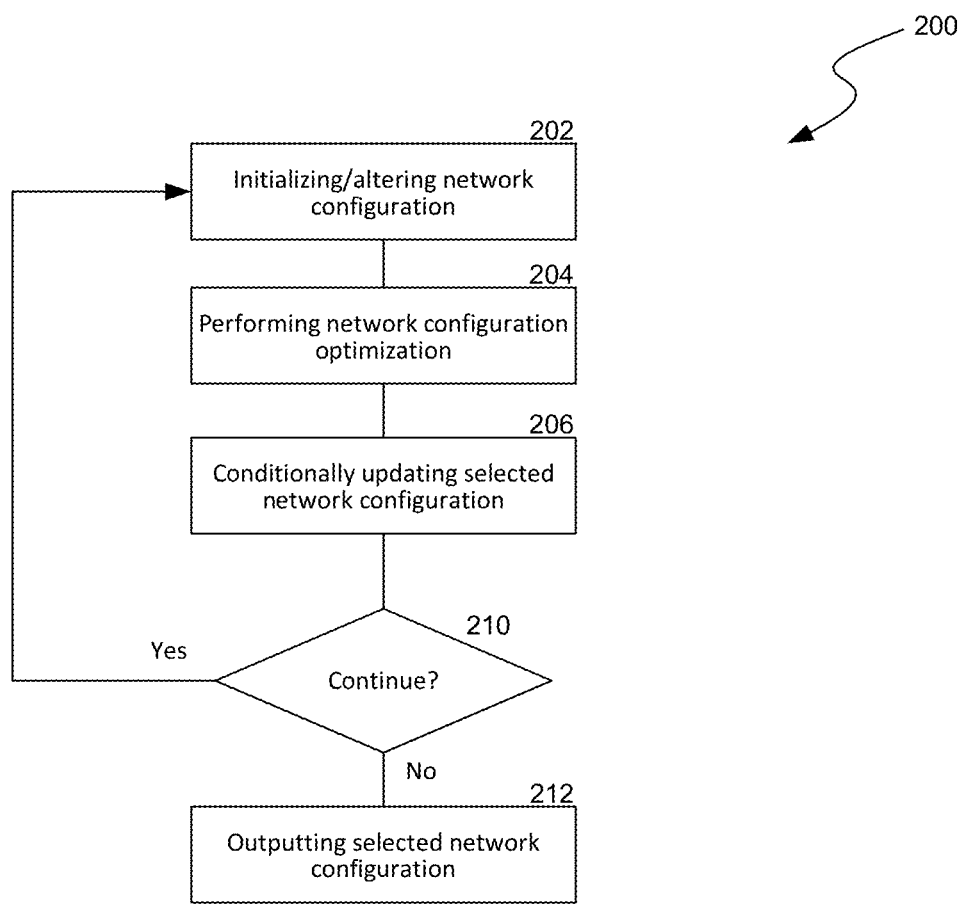
FIG. 6 is a flowchart illustrating a method of determining a hierarchical organization for computing cores suitable for the computing device of FIG. 2 in accordance with embodiments of the technology.

FIG. 6 is a flowchart illustrating a method 200 of determining a hierarchical organization for computing cores suitable for the computing device 111 of FIG. 2 in accordance with embodiments of the technology. The following description first defines selection metrics and then discusses selection procedures for obtaining a suitable number of wireless interfaces ("WIs") and the placement thereof. Even though simulated annealing is used below as an example of selection technique, in other embodiments, evolutionary algorithms, co-evolutionary algorithms exhaustive search, quantum annealing, Stochastic tunneling, and/or other suitable heuristics may also be used.

Selection Metrics

In certain embodiments, two metrics accounting for performance as well as cost may be defined to determine a suitable number of wireless interfaces as discussed below for illustration purposes. In other embodiments, additional and/or different metrics may also be used.

The first metric, which is believed to measure approximate network performance, may be defined as an average shortest path, p between all pairs of wired and wireless hubs 134, 136 (FIGS. 3A and 3B). As used herein, a single hop refers to a path length between a source and destination pair that can be traversed in one clock cycle. The distances can then be weighted with the normalized frequencies of communication between hub pairs. The metric, μ can be calculated as $$\mu = \Sigma h_{i,j} * f_{i,j} / [(N^2-N)*F] \quad (1)$$

$$h_{i,j} = p * d_{i,j\_with\_shortcut} + (1-p) d_{i,j\_without\_shortcut} \quad (2)$$

where $h_{i,j}$ is the distance (in hops) between the $i^{th}$ source and $j^{th}$ destination. N is a number of hubs, and d is an N×N matrix, in which element $d_{i,j}$ is a distance (shortest path) between hub i and hub j. The frequency $f_{i,j}$ of communication between the $i^{th}$ source and $j^{th}$ destination is a frequency of the traffic interactions between the subnets determined by a particular traffic pattern. The overall frequency of communication (F) can then be calculated as follows:

$$F = \Sigma f_{i,j} \quad (3)$$

The probability of wireless communications between any source-destination pair is designated by p which is inversely proportional to the number of WIs (n) sharing the same frequency channel. With the assumption that all the WIs are equally likely to have access to the wireless channel, p can be computed as follows:

$$p = 1/n \quad (4)$$

The second metric can be a cost function as follows:

$$\text{Cost}(\# \text{ of } WI) = A + P + L \quad (5)$$

where, A, P and L are normalized area, power, and wireless access delay overhead, respectively, arising from WIs. A is determined by dividing a total wireless hub area by an area of a communication infrastructure. The power dissipated by all WIs is divided by a total power consumed by the communication infrastructure to determine P. L is determined by diving a token returning period as described below by an average packet latency.

Many methods may be used for evaluating multi-objective selection. In the illustrated embodiment, an aggregate objective function (AOF), which combines the first and second metrics may be defined as follows:

$$\text{AOF} = a*\mu + (1-a)*\text{Cost} \quad (6)$$

where, a specifies an importance of the first and second metrics. Thus, a=0 results in an analysis entirely dependent on cost while a=1 results in an analysis entirely dependent on the network connectivity. The choice of a may be a design decision based on design requirements. For a chosen value of a, a number of WIs (n) may be selected that results in a target value (e.g., a minimum) of AOF.

As shown in FIG. 6, the method 200 includes initializing a network configuration at stage 202. In one embodiment, the network configuration may be initialized as having one WI at a random subnet 120 (FIG. 2). In other embodiments, the network configuration may be initialized as having any other number of WIs at certain subnets 120.

The method 200 then includes performing network configuration optimization at stage 204. In one embodiment, a simulated annealing ("SA") technique is applied to perform the network configuration optimization on the metric AOF defined by Equation (6) above. During each SA iteration, a new network may be generated by randomly reassigning a WI. The metric AOF for the new network is calculated.

The method 200 then includes conditionally updating the selected network configuration at stage 206. In one embodiment, the AOF value of the current network is compared to that of a previous one. If the AOF value of the current network is lower than that of the previous one, the selected network configuration is updated with the current network configuration. However, even if the metric AOF is higher than that of the previously, the selected network configuration may still be determined probabilistically.

The method 200 then includes a decision stage 210 to determine if the process should continue. In one embodiment, a convergence criterion may be that the metric AOF at the end of an iteration differs by less than 0.1% from a previous iteration. Thus, if the convergence criterion is met, the process may proceed to outputting the selected network configuration at stage 212; otherwise, the process reverts to altering network configuration at stage 202.

Figure 7:
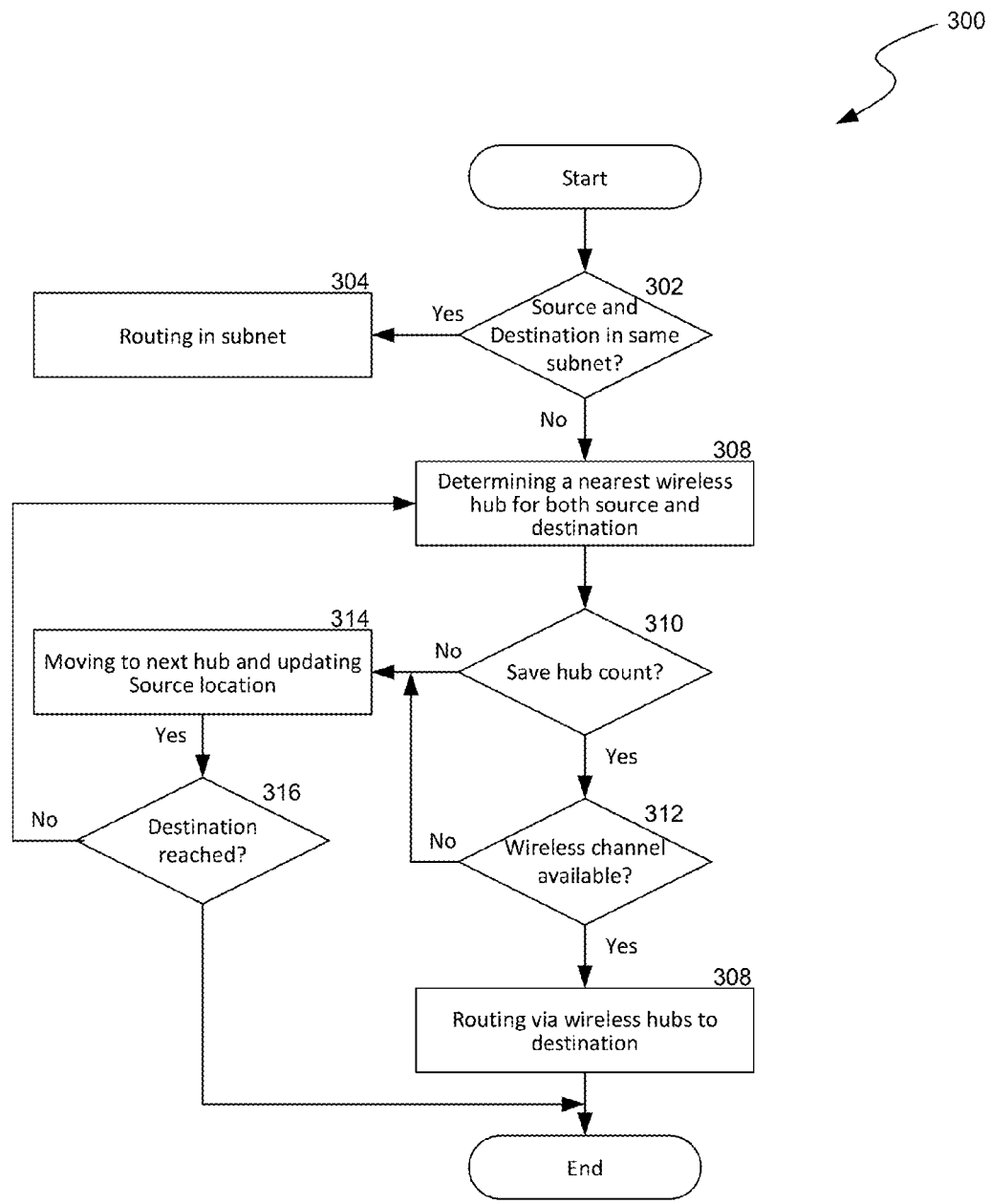
FIG. 7 is a flowchart illustrating a method of routing communications in the computing device of FIG. 2 in accordance with embodiments of the technology.

FIG. 7 is a flowchart illustrating a method 300 of routing communications in the computing device 111 of FIG. 2 in accordance with embodiments of the technology. As shown in FIG. 7, the method 300 includes a decision stage 302 to determine if a source core is in the same subnet as a destination core. If the source core is in the same subnet as the destination core, the method 300 includes routing communications in the subnet via the connectors 131. In one embodiment, if the destination core is within two (or other suitable number of) hops from the source core, then communications is routed along the cores. If the destination core is more than two hops away from the source core, then communications may be routed via the hub.

If the source core is not in the same subnet as the destination core, the method 300 includes determining a nearest wireless hub for both the source and destination core at stage 308. The method 300 then includes a decision stage 310 to determine if utilizing the wireless interfaces at the nearest wireless hubs has a lower hub count than routing via the wired interconnects 121 (FIG. 2). If utilizing the wireless interfaces at the nearest wireless hubs has a lower hub count than routing via the wired interconnects 121, the method 300 includes another decision stage 312 to determine if a wireless channel is available between the determined nearest wireless hubs. If a wireless channel is available, the method 300 includes routing via the determined wireless hubs from the source core to the destination core.

If either utilizing the wireless interfaces at the nearest wireless hubs does not have a lower hub count than routing via the wired interconnects 121, or a wireless channel is not available, the method 300 includes moving to a next hub and updating a location of the source core at stage 314. The method 300 then includes another decision stage 316 to determine if the destination node is reached. If the destination node is reached, the process ends; otherwise, the process reverts to determining a nearest wireless hub for both the source and destination cores at stage 308.

Figure 8:
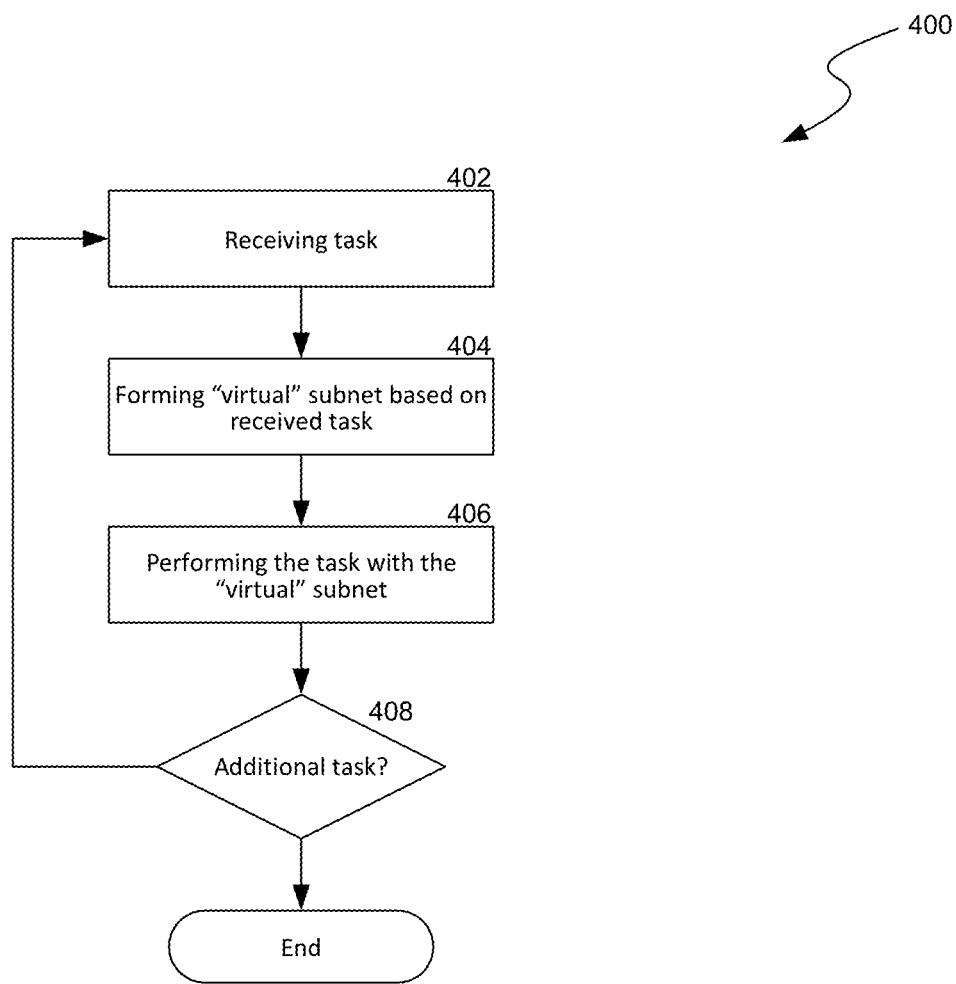
FIG. 8 is a flowchart illustrating a method of configuring "virtual" computing subnet(s) in the computing device of FIG. 2 in accordance with embodiments of the technology.

FIG. 8 is a flowchart illustrating a method 400 of configuring "virtual" computing subnet(s) in the computing device of FIG. 2 in accordance with embodiments of the technology. As shown in FIG. 8, the method 400 includes receiving a task (e.g., task 112 in FIG. 1) at stage 402.

The method 400 also includes forming a "virtual" subnet based on the received task at stage 404. In one embodiment, forming the virtual subnet can include determining a profile of the received task and selecting cores (e.g., the cores 132 of FIGS. 3A and 3B) that are more suitable than others to execute the received task based on the determined profile. For example, if the received task is related to video processing, cores 132 that are specifically configured for video processing may be selected. The selected cores 132, which may reside in different subnets 120 can then be formed into a "virtual" subnet.

In other embodiments, the cores 132 for the "virtual" subnet can also be selected based at least in part on access to nearby wireless interfaces. For example, if two cores 132 are both suitable for the received task, a core 132 that is connected to a wireless hub 136 (FIG. 3B) via the connector 131 (FIG. 3B) may be selected over the other core 132 connected to a wired hub 134 (FIG. 3A). In further embodiments, the cores 132 may be selected based on additional and/or different criteria. The cores 132 in the "virtual" subnet may communicate with one another via wired and/or wireless interconnects 121, 123 (FIG. 2) as discussed above with reference to FIG. 7.

The method 400 can then include performing the received task with the formed "virtual" subnet at stage 406. In one embodiment, the performance of the received task is facilitated by the wireless interconnects 123 (FIG. 2). In other embodiments, the received task may be performed with cores 132 that are interconnected with the wired interconnects 121 (FIG. 2). The method 400 then includes a decision stage 408 to determine if an additional task is present. In response to determining that an additional task is present, the process reverts to receiving the additional task at stage 402; otherwise, the process ends.

Experiments

Figure 9:
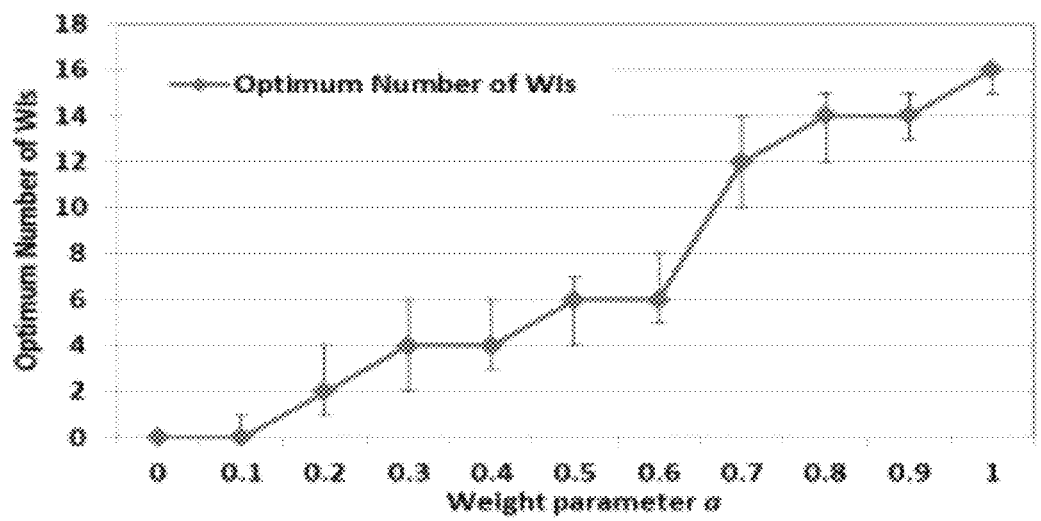
FIG. 9 illustrates a plot of number of wireless interconnects versus a weight parameter a in accordance with embodiments of the technology.
Figure 10:
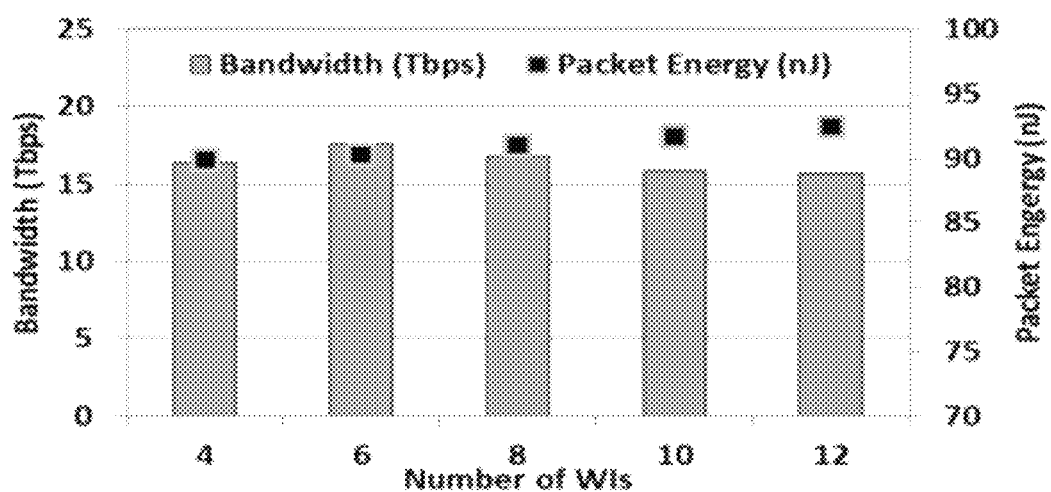
FIG. 10 illustrates a bar graph showing examples of communication bandwidth and packet energy based on various numbers of wireless interconnects in accordance with embodiments of the technology.

Experiments were conducted to test communications efficiency of a NoC device configured generally similarly as the computing device 111 of FIG. 2. The selected number of WIs (n) obtained for different values of a for a 16-hub computing device with one wireless channel is shown in FIG. 9. As can be seen in FIG. 9, for a moderate weight value, a (varying from 0.30 to 0.7), the selected number of WIs varies from 4 to 12. The error bars represent the overall variation of the number of WIs for different execution of the process. As shown in FIG. 10, for a 256-core NoC computing device (16-subnets with 16 cores in each subnet), bandwidth increased with number of WIs until reaching a maximum at 6 WIs before decreasing. Thus, the selected number of WIs was 6.

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments. Accordingly, the disclosure is not limited except as by the appended claims.

I claim:
1. A computing device, comprising:
a substrate;
a plurality of computing cores on the substrate, the individual computing cores including one or more computing processors, wherein the computing cores are organized into a plurality of subnets individually associated with:
a set of the computing cores;
a communications hub associated with the set of the computing cores; and
a plurality of conductive or semi-conductive connectors connecting the set of the computing cores into a small world network and connecting the communications hub to the set of the computing cores; and a plurality of wireless transceivers on the substrate, the wireless transceivers being individually associated with one of the communications hubs of a corresponding subnet.

2. The computing device of claim 1 wherein the plurality of conductive or semi-conductive interconnects connect the set of the computing cores and the communications hub in a star ring structure.

3. The computing device of claim 1, further comprising a plurality of conductive or semi-conductive interconnects connecting adjacent pairs of the subnets in a mesh structure.

4. The computing device of claim 1, further comprising a plurality of conductive or semi-conductive interconnects connecting the communications hubs of adjacent pairs of the subnets in a mesh structure.

5. The computing device of claim 1, further comprising a conductive or semi-conductive interconnect connecting the communications hub of a first one of the subnets and the communications hub of a second one of the subnets, the first one of the subnets being associated with one of the wireless transceivers and the second one of the subnets not being associated with one of the wireless transceivers.

6. The computing device of claim 1 wherein a propagation length between a pair of the wireless transceivers is greater than a threshold, the propagation length representing a number of hops between the subnets associated with the pair of the wireless transceivers via the conductive or semi-conductive interconnects.

7. The computing device of claim 1 wherein a number of the wireless transceivers is less than a number of the subnets, and wherein a propagation length between a pair of the wireless transceivers is greater than two, the propagation length representing a number of hops between the subnets associated with the pair of the wireless transceivers via the conductive or semi-conductive interconnects.

8. A method of routing communications messages on a computing device having a plurality of computing cores on a common substrate, the computing cores being interconnected via conductive or semi-conductor connectors into a plurality of subnets individually associated with a set of the computing cores and a communications hub, at least some of the subnets having a wireless transceiver at the communications hub, the method comprising:
   determining a pair of the subnets each having a wireless transceiver at the corresponding communications hub, each of the subnets being closest to a source computing core and a destination computing core, respectively;
   determining if a propagation length between the source and destination computing cores is shorter via the first and second subnet with corresponding wireless transceivers or via the conductive or semi-conductor connectors; and
   in response to determining that the propagation length between the source and destination computing cores is shorter via the first and second subnet with corresponding wireless transceivers, routing communications between the source and destination computing cores via the first and second subnets with the corresponding wireless transceivers.

9. The method of claim 8 wherein the propagation length is represented by a number of hops between the source and destination computing cores, each hop corresponding to a communications distance between a pair of adjacent computing cores.

10. The method of claim 8 wherein in response to determining that the propagation length between the source and destination computing cores is shorter via the conductive or semi-conductive connectors, routing communications between the source and destination computing cores via the conductive or semi-conductive connectors.

11. The method of claim 8, further comprising:
   determining if a wireless channel is available between the first and second subnets; and
   in response to determining that a wireless channel is available between the first and second subnets, routing communications between the source and destination computing cores via the first and second subnets with the corresponding wireless transceivers.

12. The method of claim 8, further comprising:
   determining if a wireless channel is available between the first and second subnets; and
   in response to determining that a wireless channel is not available between the first and second subnets, assigning a computing core adjacent to the source computing core as a new source computing core and repeating the determining operations with the new source computing core.

13. The method of claim 8, further comprising:
   determining if the source and destination computing cores are in the same subnet; and
   in response to determining that the source and destination computing cores are in the same subnet, routing communications between the source and destination computing cores via the conductive or semi-conductive connectors in the same subnet.

14. The method of claim 8, further comprising:
   determining if the source and destination computing cores are in the same subnet;
   in response to determining that the source and destination computing cores are in the same subnet, routing communications between the source and destination computing cores via the conductive or semi-conductive connectors in the same subnet; and
   in response to determining that the source and destination computing cores are not in the same subnet, performing the determining operations.

15. A computing device having a plurality of computing cores on a common substrate, the computing cores being interconnected via conductive or semi-conductor connectors into a plurality of subnets individually associated with a set of the computing cores and a communications hub, at least some of the subnets having a wireless transceiver at the communications hub, the computing device further includes a memory containing instructions executable by one or more of the computing cores to cause the computing device to:
   determine a pair of the subnets each having a wireless transceiver at the corresponding communications hub, each of the subnets being closest to a source computing core and a destination computing core, respectively;
   determine if a propagation length between the source and destination computing cores is shorter via the first and second subnet with corresponding wireless transceivers or via the conductive or semi-conductor connectors; and
   in response to determining that the propagation length between the source and destination computing cores is shorter via the first and second subnet with corresponding wireless transceivers, route communications between the source and destination computing cores via the first and second subnets with the corresponding wireless transceivers.

16. The computing device of claim 15 wherein the propagation length is represented by a number of hops between the source and destination computing cores, each hop corresponding to a communications distance between a pair of adjacent computing cores.

17. The computing device of claim 15 wherein the memory contains additional instructions executable by one or more of the computing cores to cause the computing device to route communications between the source and destination computing cores via the conductive or semi-conductive connectors in response to determining that the propagation length between the source and destination computing cores is shorter via the conductive or semi-conductive connectors.

18. The computing device of claim 15 wherein the memory containing additional instructions executable by one or more of the computing cores to cause the computing device to:
   determine whether a wireless channel is available between the first and second subnets; and
   in response to determining that a wireless channel is available between the first and second subnets, route communications between the source and destination computing cores via the first and second subnets with the corresponding wireless transceivers.

19. The computing device of claim 15 wherein the memory containing additional instructions executable by one or more of the computing cores to cause the computing device to:
   determine whether a wireless channel is available between the first and second subnets; and
   in response to determining that a wireless channel is not available between the first and second subnets, assign a computing core adjacent to the source computing core as a new source computing core and repeating the determining operations with the new source computing core.

20. The computing device of claim 15 wherein the memory containing additional instructions executable by one or more of the computing cores to cause the computing device to:
   determine whether the source and destination computing cores are in the same subnet; and
   in response to determining that the source and destination computing cores are in the same subnet, route communications between the source and destination computing cores via the conductive or semi-conductive connectors in the same subnet.

* * * * *